United States Patent [19]
Purits

[11] Patent Number: 5,610,978
[45] Date of Patent: Mar. 11, 1997

[54] RING DISCRIMINATOR

[75] Inventor: Valentin Purits, Thornhill, Canada

[73] Assignee: Mitel Corporation, Kanata, Canada

[21] Appl. No.: 366,911

[22] Filed: Dec. 30, 1994

[51] Int. Cl.⁶ .................................................. H04M 1/00
[52] U.S. Cl. .......................... 379/373; 379/376; 379/342
[58] Field of Search ................................... 379/373, 375, 379/376, 377, 413, 342

[56] References Cited

U.S. PATENT DOCUMENTS

| | | | |
|---|---|---|---|
| 4,066,848 | 1/1978 | Darwood | 379/373 |
| 4,188,508 | 2/1980 | Rogers et al. | 379/342 |
| 4,365,116 | 12/1982 | Pira et al. | 379/373 |
| 4,496,798 | 1/1985 | Colardelle et al. | 379/375 |
| 4,540,855 | 9/1985 | Szlam et al. | 179/84 R |
| 4,658,419 | 4/1987 | Denen | 379/375 |

FOREIGN PATENT DOCUMENTS

| | | |
|---|---|---|
| 1460996 | 8/1974 | United Kingdom . |
| 1595238 | 11/1977 | United Kingdom . |
| 2157918 | 4/1985 | United Kingdom . |

*Primary Examiner*—Ahmad F. Matar
*Assistant Examiner*—Keith Ferguson
*Attorney, Agent, or Firm*—Pascal & Associates

[57] ABSTRACT

A ring discriminator comprised of apparatus for receiving an input ringing signal, a counter, apparatus for applying clock pulses to the counter, apparatus for enabling the counter to count clock pulses from a cycle of ringing current, and apparatus for determining a clock pulse count on the counter to distinguish a frequency characteristic of the ringing signal.

4 Claims, 2 Drawing Sheets

RING DISCRIMINATOR

FIELD OF THE INVENTION

This invention relates to the field of telephony, and in particular to a ringing signal discriminator.

BACKGROUND TO THE INVENTION

Ringing signal discriminators (referred to below as ring discriminators) detect the presence of ringing signals from other signals that may be present on a telephone line, such as noise, dual tone multifrequency (DTMF) signals, crosstalk from other telephone lines, control signals of various types, harmonics generated from various signals and noise such as control signals, etc.

In certain jurisdictions a ringing detector is required to react to any signal of at least a certain amplitude within the frequency band of 23 and 54 Hz as a true ringing signal, and outside of the band of 18 and 64 Hz as a false signal. 18–24 and 45–64 Hz zones are insensitive zones (see FIG. 1). Frequencies 20 and 60 Hz are chosen roughly in the middle of the insensitive zones as two digital thresholds between which the existence of a ringing signal is considered to be true. The reason for that is that the factor 3 (60/20) is easy to detect digitally.

A ringing signal is thus considered to have a frequency of between 20 Hz and 60 Hz. Only +/− 8.3% separates 64 Hz, a false ringing frequency threshold, and 54 Hz, which is within the band and which is a true ringing frequency threshold. It has been found that circuits that use analog signals are slow in detecting the ringing signal, requiring several ringing cycles to be able to detect the ringing signal, and are sensitive to tolerance variations in the components which make up the ringing signal.

Slow ringing signal detection can result in lost calls due to a receiving party taking a handset off hook prior to completion of ringing signal detection. Ringing signals cannot be recognized in this case though they exist, and connection of the call cannot be made. Sensitivity to tolerance variations can result in in-band ringing signals not being detected or out-of-band signals being mistaken for in-band ringing signals.

SUMMARY OF THE INVENTION

The present invention is a ring discriminator which can detect the presence of a ringing signal at the end of only one and a half of a first ringing cycle, and thus can provide a ringing control signal extremely quickly to a called party or to equipment which is enabled in the presence of a ringing signal. Further, the sensitivity of the present invention to component tolerance variations is substantially reduced due to a ringing signal detection mechanism which is for the most part digital.

In accordance with the present invention, a ring discriminator is comprised of apparatus for receiving an input ringing signal, a counter, apparatus for applying clock pulses to the counter, apparatus for enabling the counter to count clock pulses from a cycle of ringing current, and apparatus for determining a clock pulse count on the counter to distinguish a frequency characteristic of the ringing signal. It is preferred that the cycle of ringing current is a first cycle in a ring burst.

In accordance with a further embodiment, in the aforenoted ring discriminator the counter enabling apparatus is comprised of apparatus for detecting the beginning and the end of a single pulse period for generating an enable pulse beginning and ending at the beginning and end of the single pulse period, and for applying the enable pulse to the counter.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
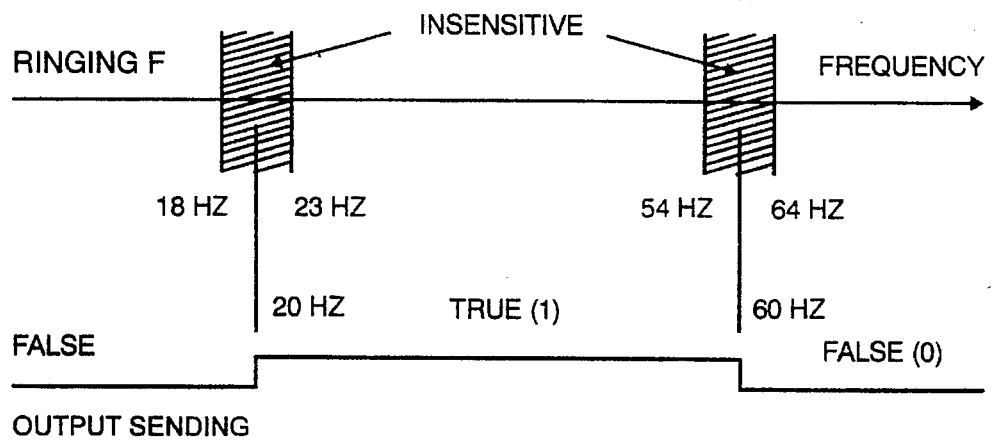
FIG. 1 is a frequency chart of in-band and out-of-band ringing signals.
Figure 2:
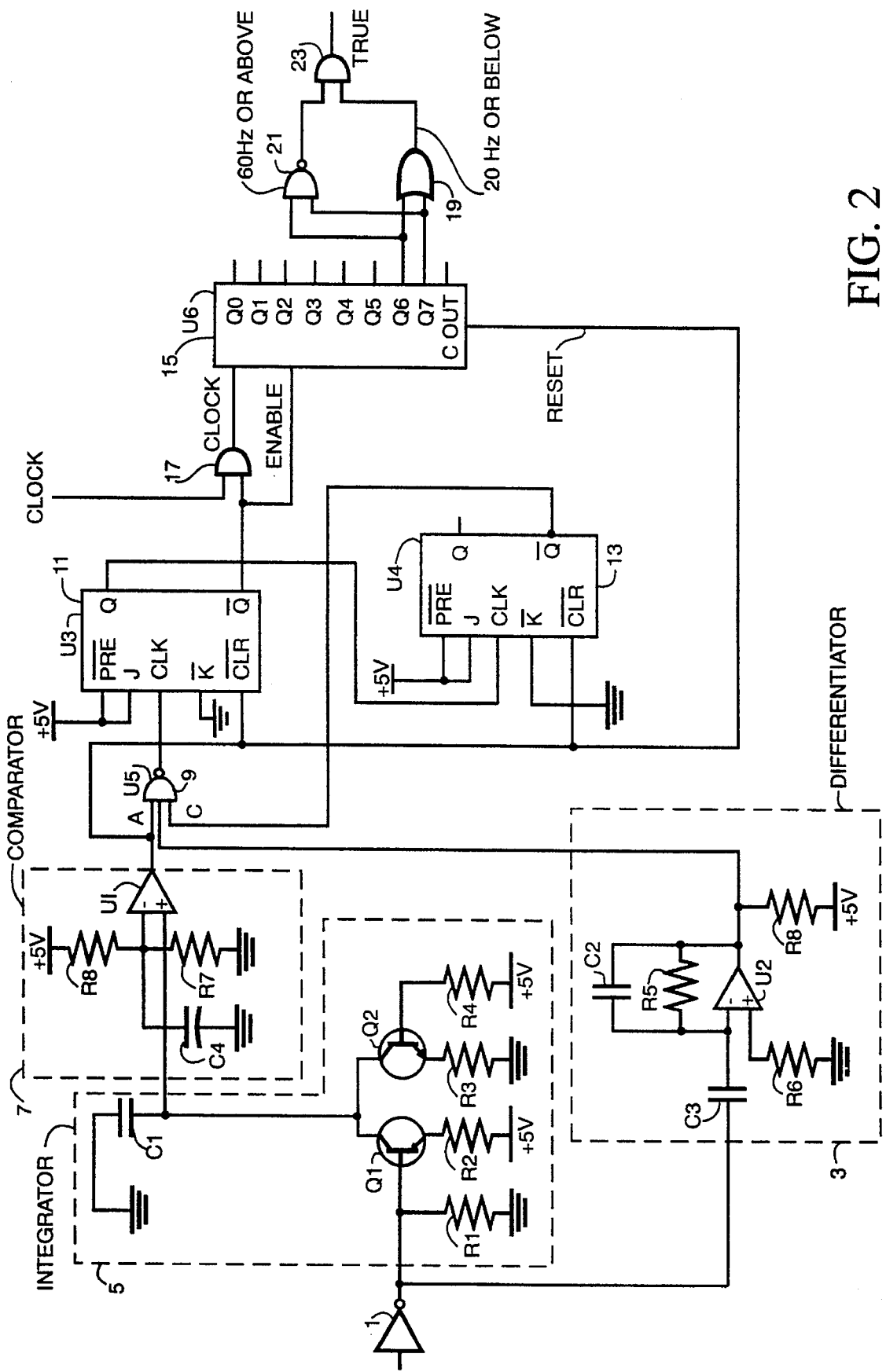
FIG. 2 is a schematic diagram of a preferred embodiment of the present invention.

A preferred embodiment of the invention will be described with reference to both of FIGS. 2 and 3 together. A ringing signal to be discriminated, shown as the RING IN signal in FIG. 1, is applied to the input of an operational amplifier 1, which acts to both buffer the ringing signal and to limit it (e.g. by clipping) into somewhat square-wave form.

The output signal of clipping operational amplifier 1 is applied to the inputs of a differentiator 3, which differentiates the leading edge of the output signal from operational amplifier 1. That differentiated signal is shown as the DIFF OUT signal in FIG. 3.

The output signal of operational amplifier 1 is also applied to the input of an integrator 5, which has a fast charge time and a slow discharge time. The integrated output signal may be detected across capacitor C1, and is shown in FIG. 3 as signal CAP C1.

Both the integrator and differentiator are of conventional and well known construction.

The output signal of the integrator 5 is applied to one input of a comparator 7, which converts the output of the integrator into square wave. Since the integrator integrates the ringing signals over all cycles of each ring burst, the square wave output signal from integrator 5 is a pulse which lasts the interval of the ring burst (i.e. corresponds to the ring burst envelope), but starts later than the beginning of the first ringing cycle by a phase shift of 90 degrees. This will occur at whatever the frequency of the ringing signal.

Both the output signal of the comparator 7 and the output signal of the differentiator 3 are applied to respective inputs of NAND gate 9. The output of the NAND gate 9 is applied to the clock input CLK of a first self-latching flip flop 11. The Q output of flip flop 11 is applied to the clock input CLK of a second self-latching flip flop 13, and the /Q output of flip flop 13 is connected to another input of NAND gate 9. An enable pulse is provided at the /Q output of flip flop 11, as will be described below.

Figure 3:
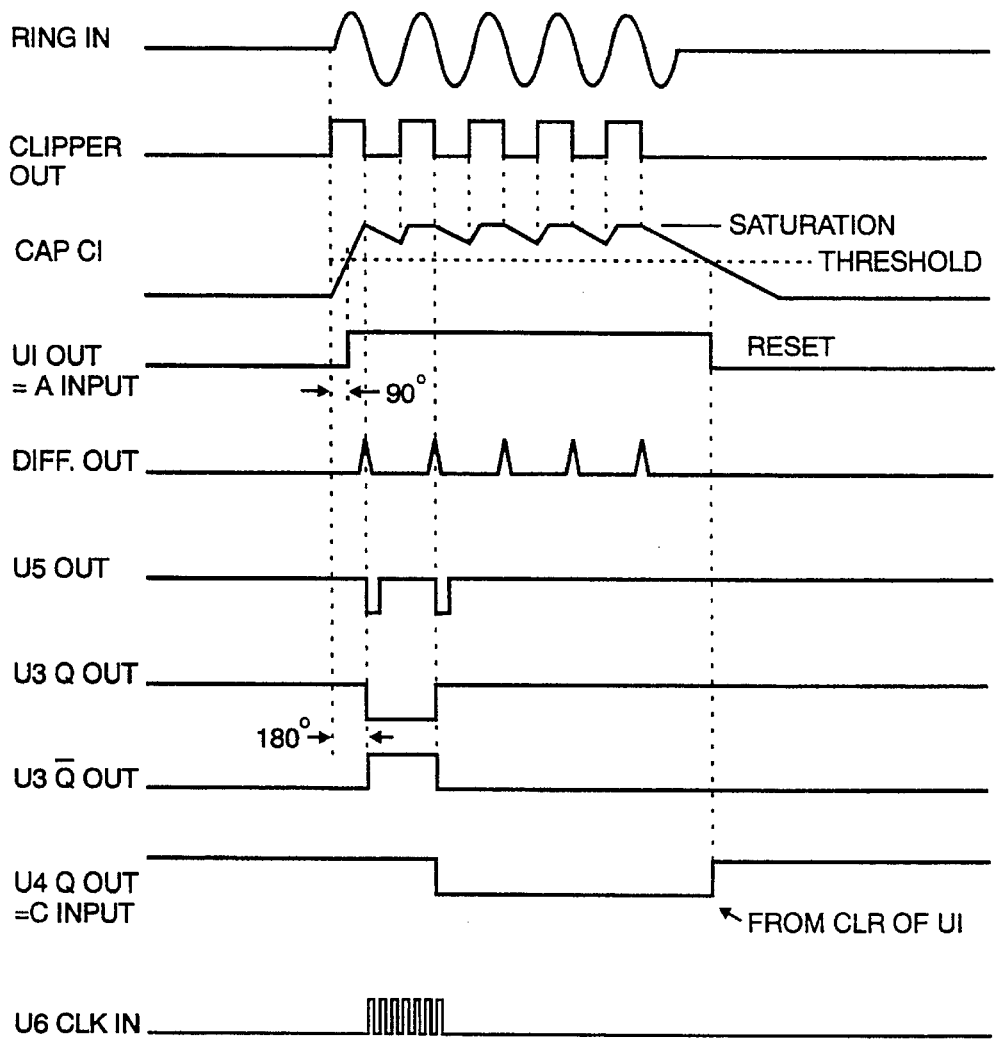
FIG. 3 is a waveform diagram illustrating the forms of signals at various locations in the circuit illustrated in FIG. 1.

Prior to the receipt of an input ringing signal, the /Q output of flip flop 13 is at high logic level, as may be seen from waveform U4 in FIG. 3, and is applied to an input of NAND gate 9. With the receipt of ringing signals, the output of the comparator 7 (signal U1 OUTPUT in FIG. 3) goes to high logic level, with the envelope of the ringing burst, and is received at an input to NAND gate 9. Pulses resulting from differentiation of the leading edges of the ringing cycles as indicated by the DIFF OUT signal are applied to an input of NAND gate 9. The result are pulses at the output of NAND gate 9 of the waveform U5 OUTPUT shown in FIG. 3. Those pulses are received at the CLK input of flip flop 11.

With the receipt of the first pulse at the CLK input of flip flop 11, its /Q output goes to high logic level, shown as waveform U3 /Q OUTPUT, and its Q output goes to low logic level. With the receipt of the second pulse at the CLK input of flip flop 11, its /Q output goes to low logic level and its Q output goes to high logic level, as may be seen in FIG. 2. Thus for the interval of one ringing cycle the output /Q is at high logic level, and outside that ringing cycle that output is at low logic level.

The inverse of that pulse, at the Q output of flip flop 11, is applied as a clock pulse to the CLK input of flip flop 13. As a result, the /Q output of flip flop 13 changes from high to low logic level at the termination of the clock pulse applied to its CLK input. That low logic level signal, applied to an input of NAND gate 9, causes inhibition of the differentiated leading edges of the ringing signal from passing through NAND gate 9. As a result only two of such pulses pass through NAND gate 9, representing the beginning of successive ringing cycles, i.e. the beginning and the end of a single ringing cycle (shifted 180 degrees) and being the first ringing cycle of a ring burst. This may be seen from the waveform diagrams of FIG. 3.

Thus only a single pulse signal /Q OUTPUT is provided at the /Q output of flip flop 11 resulting from the first ringing cycle of a ring burst. That single pulse signal is used as an enable signal to an enable input of a binary counter 15.

A clock signal is also applied to the counter 15, preferably through an AND gate 17 with the enable pulse, as shown.

Thus during the interval of an enable pulse, clock signals can pass through AND gate 17 to the counter 15, which is enabled to count clock pulses during that interval. The count reached by the counter represents the period of the enable pulse, which corresponds directly to the frequency of the input ringing signal.

To discriminate the frequency of a received ringing signal as being within or outside a standard ringing frequency band, the Q6 and Q7 terminals of the counter are connected to the respective inputs of a NOR gate 19 and to the respective inputs of a NAND gate 21. The outputs of gates 19 and 21 are applied to the inputs of an AND gate 23. The output of AND gate 23 is an output signal which indicates by a TRUE signal if the input ringing signal frequency is within a band indicated by the clock count reached by counter 15 during the interval when it is enabled.

To reset the circuit, the U1 OUTPUT signal, which lasts for the interval of the ring burst envelope, from the output of comparator 7, is applied to the clear inputs CLR of both flip flops 11 and 13, and to the reset input RESET of the counter 15. Thus when the U1 OUTPUT signal goes to low logic level, at the end of a ring burst, both flip flops are reset to their initial state and the counter is cleared, ready for receipt of a subsequent ring burst.

As an example in the diagram illustrated if the count reaches 01000000 (decimal 64) the frequency of the input ringing signal is 60 Hz and if the count reaches 11000000 (decimal 192) the frequency of the input ringing signal is 20 Hz. These frequencies represent the highest and lowest threshold frequencies of the ringing signal band. The clock frequency, the clock pulses of which are counted by the counter 15, in this case can be calculated as 64 (count)×60 (Hz)=3840 Hz, or 192 (count)×20 Hz=3840 Hz.

It will of course be recognized that the number of bits counted in the counter 15 may be used, a different counter may be used, and various forms of logical circuits may be used to realize the present invention, other than the exact circuitry shown, to realize the present invention. In addition the present invention can be used to discriminate signals other than ringing signals, and the term ringing signals should be construed to mean any input signals of similar characteristic which are capable of being discriminated by the present invention. In addition the circuitry connected to the output of the counter 15 may be used to indicate the frequency or period of the ringing input signal, rather than merely that the ringing input signal is within a particular band of frequencies.

A person understanding this invention may now conceive of alternative structures and embodiments or variations of the above. All of those which fall within the scope of the claims appended hereto are considered to be part of the present invention.

I claim:

1. A ring discriminator comprising means for receiving an input ringing signal, a counter, means for applying clock pulses to the counter, means for enabling the counter to count clock pulses from a cycle of ringing current, and means for determining a clock pulse count on the counter to distinguish a frequency characteristic of the ringing signal, the cycle of ringing current being a first cycle in a ring burst, the counter enabling means being comprised of a differentiator for differentiating leading edges of the input ringing signal, an integrator for generating a ring burst envelope pulse for the duration of each ring burst of the input ringing signal, a NAND gate for receiving the differentiated leading edges and the ring burst envelope pulse, means for generating an enable pulse beginning at every second differentiated leading edge and ending at every alternate following differentiated leading edge, means for inhibiting the enable pulse generating means from the end of a first enable pulse and means for applying a resulting single enable pulse to the counter.

2. A ring discriminator as defined in claim 1 in which the means for determining a clock pulse count is comprised of a logic circuit to output a TRUE signal in the event the count is above or below a predetermined count range.

3. A ring discriminator as defined in claim 1 in which the means for generating an enable pulse and the means for inhibiting the enable pulse are comprised of a NAND gate for receiving the differentiated leading edges and the ring burst envelope pulse at inputs thereof, a first self-latching flip flop for receiving an output signal of the NAND gate at a clock input and for providing said enable pulse at a Q output thereof, a second self-latching flip flop for receiving at a clock input thereof an output signal from a /Q output of the first flip flop, and means for applying an output signal of the NAND gate.

4. A ring discriminator as defined in claim 3 further including means for applying the ring burst envelope pulse to clear inputs of the flip flops and to a reset input of the counter.

\* \* \* \* \*

UNITED STATES PATENT AND TRADEMARK OFFICE
CERTIFICATE OF CORRECTION

PATENT NO.   : 5,610,978
DATED        : March 11, 1997
INVENTOR(S)  : Valentin PURITS It is certified that error appears in the above-identified patent and that said Letters Patent is hereby corrected as shown below:

Column 4, line 54, delete "Q" and insert --/Q--;

Column 4, line 56, delete "/Q-- and insert --Q--.

In the Drawings:

Figure 3, delete "U4 Q OUT" and insert --U4 $\overline{Q}$ OUT--.

Signed and Sealed this

Twenty-first Day of September, 1999

Attest:

Q. TODD DICKINSON

*Attesting Officer*     *Acting Commissioner of Patents and Trademarks*